US010324466B2

United States Patent
Erickson et al.

(10) Patent No.: US 10,324,466 B2
(45) Date of Patent: Jun. 18, 2019

(54) PERSONALITY SHARING AMONG DRONE SWARM

(71) Applicant: International Business Machines Corporation, Armonk, NY (US)

(72) Inventors: Thomas D. Erickson, Minneapolis, MN (US); Kala K. Fleming, New York, NY (US); Clifford A. Pickover, New York, NY (US); Komminist Weldemariam, Nairobi (KE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/417,644

(22) Filed: Jan. 27, 2017

(65) Prior Publication Data
US 2018/0217593 A1    Aug. 2, 2018

(51) Int. Cl.
G05D 1/00 (2006.01)
G05D 1/10 (2006.01)
G06N 3/00 (2006.01)
G08G 5/00 (2006.01)

(52) U.S. Cl.
CPC .......... G05D 1/0088 (2013.01); G05D 1/104 (2013.01); G06N 3/008 (2013.01); G08G 5/006 (2013.01); G08G 5/0008 (2013.01); G08G 5/0013 (2013.01); G08G 5/0069 (2013.01); G08G 5/0086 (2013.01)

(58) Field of Classification Search
USPC .......................................................... 701/4
See application file for complete search history.

(56) References Cited

U.S. PATENT DOCUMENTS

| 8,751,042 | B2 | 6/2014 | Lee |
| 8,914,182 | B2* | 12/2014 | Casado ................ G05D 1/0088 |
| | | | 701/24 |
| 8,996,429 | B1 | 3/2015 | Francis, Jr. |
| 9,104,201 | B1* | 8/2015 | Pillai ..................... B64C 39/024 |
| 9,321,529 | B1* | 4/2016 | Jones ...................... B64C 39/02 |
| 9,457,900 | B1* | 10/2016 | Jones ...................... B64C 39/02 |
| 9,563,203 | B2* | 2/2017 | Davoodi .............. G05D 1/0088 |
| 10,034,066 | B2* | 7/2018 | Tran ......................... H04Q 9/00 |
| 2002/0087498 | A1 | 7/2002 | Yoshida |

(Continued)

FOREIGN PATENT DOCUMENTS

| CN | 103218654 | 7/2013 |
| WO | 2007046613 | 4/2007 |

OTHER PUBLICATIONS

Rosalie, Martin, et al., UAV Multi-Level Swarms for Situational Management, DroNet'16, Jun. 26, 2016, Singapore, Singapore, c 2016 ACM. ISBN 978-1-4503-4405-0/16/06 (http://dx.doi.org/10.1145/2935620.2935631)(hereinafter "Rosalie").*

(Continued)

*Primary Examiner* — Jean Paul Cass
(74) *Attorney, Agent, or Firm* — Eyal Gilboa; Otterstedt, Ellenbogn & Kammer, LLP

(57) ABSTRACT

A drone identifies situational context (based on signals from at least one sensor) and selects an action in response to the situational context, based on a personality of the drone. The drone then communicates its personality to other drones within a swarm of drones, the drone being a member of the swarm of drones.

20 Claims, 10 Drawing Sheets

(56) References Cited

U.S. PATENT DOCUMENTS

| | | | |
|---|---|---|---|
| 2006/0129277 A1* | 6/2006 | Wu | G06F 3/015 700/245 |
| 2011/0046837 A1* | 2/2011 | Khosla | G05D 1/104 701/26 |
| 2011/0130636 A1* | 6/2011 | Daniel | G08B 25/016 600/301 |
| 2013/0080360 A1* | 3/2013 | Sterritt | G05B 13/02 706/14 |
| 2014/0166816 A1* | 6/2014 | Levien | B64C 39/024 244/175 |
| 2015/0185034 A1* | 7/2015 | Abhyanker | G01C 21/36 701/23 |
| 2015/0346726 A1* | 12/2015 | Davoodi | B63B 22/24 701/21 |
| 2017/0023937 A1* | 1/2017 | Loianno | G08G 5/003 |
| 2017/0113799 A1* | 4/2017 | Kovac | F03D 80/50 |
| 2017/0221394 A1* | 8/2017 | Garcia Morchon | G05D 1/104 |
| 2017/0227470 A1* | 8/2017 | Cesarano | G05D 1/0214 |
| 2017/0227963 A1* | 8/2017 | Klinger | G05D 1/0214 |
| 2017/0235316 A1* | 8/2017 | Shattil | B64C 39/024 701/3 |
| 2017/0318360 A1* | 11/2017 | Tran | H04Q 9/00 |
| 2017/0370678 A1* | 12/2017 | Holder | F41G 7/2246 |
| 2018/0101173 A1* | 4/2018 | Banerjee | G06T 7/70 |

OTHER PUBLICATIONS

Krista Almanzan, "Follow the Leader: Drones Learn to Behave in Swarms", npr.org, http://www.npr.org/templates/transcript/transcript.php?storyId=424685529 (2015). pp. 1-4.

Youdan Kim, "Optimum design of three-dimensional behavioural decentralized controller for UAV formation flight", Engineering Optimization (2009) 41:3, pp. 199-224 (Abstract and Statement O Revisions).

James F. Smith III, "Autonomous and cooperative robotic behavior based on fuzzy logic and genetic programming," Integrated Computer-Aided Engineering (2007) 14, 141-159.

Franz-Stefan Gady, "Drone Swarms: How the US Navy Plans to Fight Wars in 2016," The Diplomat, http://thediplomat.com/2015/04/drone-swarms-how-the-us-navy-plans-to-fight-wars-in-2016/ (2015). pp. 1-2.

NIST, "The NIST Definition of Cloud Computing", Special Publication 800-145 (Sep. 2011). pp. 1-7.

Olga Khazan, "This App Reads Your Emotions on Your Face", The Atlantic, http://www.theatlantic.com/technology/archive/2014/01/this-app-reads-your-emotions-on-your-face/282993/ (Jan. 2014). pp. 1-8.

Seungkeun Kim et al., Three Dimensional Optimum Controller for Multiple UAV Formation Flight Using Behavior-based Decentralized Approach. International Conference on Control, Automation and Systems 2007 Oct. 17-20, 2007, pp. 1387-1392.

* cited by examiner

PERSONALITY SHARING AMONG DRONE SWARM

BACKGROUND

The present invention relates to the electrical, electronic and computer arts, and, more particularly, to unmanned aerial vehicles ("drones" or "UAVs") and the like.

Robots, generally, have been developed over several decades to interact with humans either in response to human commands, or proactively. Robot behavior can be determined by means of a robot "personality" that defines how the robot will react to particular commands or other stimuli. For example, a robot can be provided with a character trait module that stores character traits, a user can enable the robot to have any character trait, a robot state management module correspondingly generates different states of the robot under the action of different kinds of external input information according to different character traits of the robot, and the different states are expressed through a robot emotion expressing module. Well-known machine learning algorithms can be used to autonomously develop or evolve a robot's personality in response to user inputs.

Drones are a type of flying robot that have been developed over the past decade to operate increasingly autonomously. Within the last few years, drones have become smaller and less expensive. During the same time period, relatively inexpensive drones have been programmed to operate in autonomous groups or "swarms"—for example, with one or more drones as "leaders" and others as "followers."

SUMMARY

Principles of the invention provide techniques for personality sharing among a drone swarm. In one aspect, an exemplary method includes a first drone identifying situational context (based on signals from at least one sensor) and selecting an action in response to the situational context, based on a personality of the first drone. The first drone then communicates its personality to other drones within a swarm of drones, the first drone being a member of the swarm of drones.

In another aspect, a computer program product is provided for controlling a drone in a swarm of drones. The computer program product includes a computer readable storage medium that has program instructions embodied therewith. The program instructions are executable by a drone to cause the drone to identify situational context based on signals from at least one sensor; select an action in response to the situational context, based on a personality of the drone; and communicate the personality of the drone to other drones within a swarm of drones.

In another aspect, a drone apparatus includes at least one sensor; a memory; a communications module; and at least one processor, which is coupled in communication with the memory, the sensor, and the communications module. The at least one processor is operative to identify situational context based on signals from the at least one sensor; select an action to take in response to the situational context, based on a personality facilitated in the processor; and communicate the personality to another processor via the communications module.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Techniques of the present invention can provide substantial beneficial technical effects. For example, one or more embodiments may provide one or more of the following advantages:

Enhanced coordination of drone swarms.
Rapid adaptation of drone swarm behavior to context (updated situational information).
Automation of personal security for vulnerable persons.
Enhanced efficiency of crop scouting.
Enhanced automation for smart homes and inventory management.
Enhanced disaster recovery management in resource constrained environment.

These and other features and advantages of the present invention will become apparent from the following detailed description of illustrative embodiments thereof, which is to be read in connection with the accompanying drawings.

DETAILED DESCRIPTION

Figure 1:
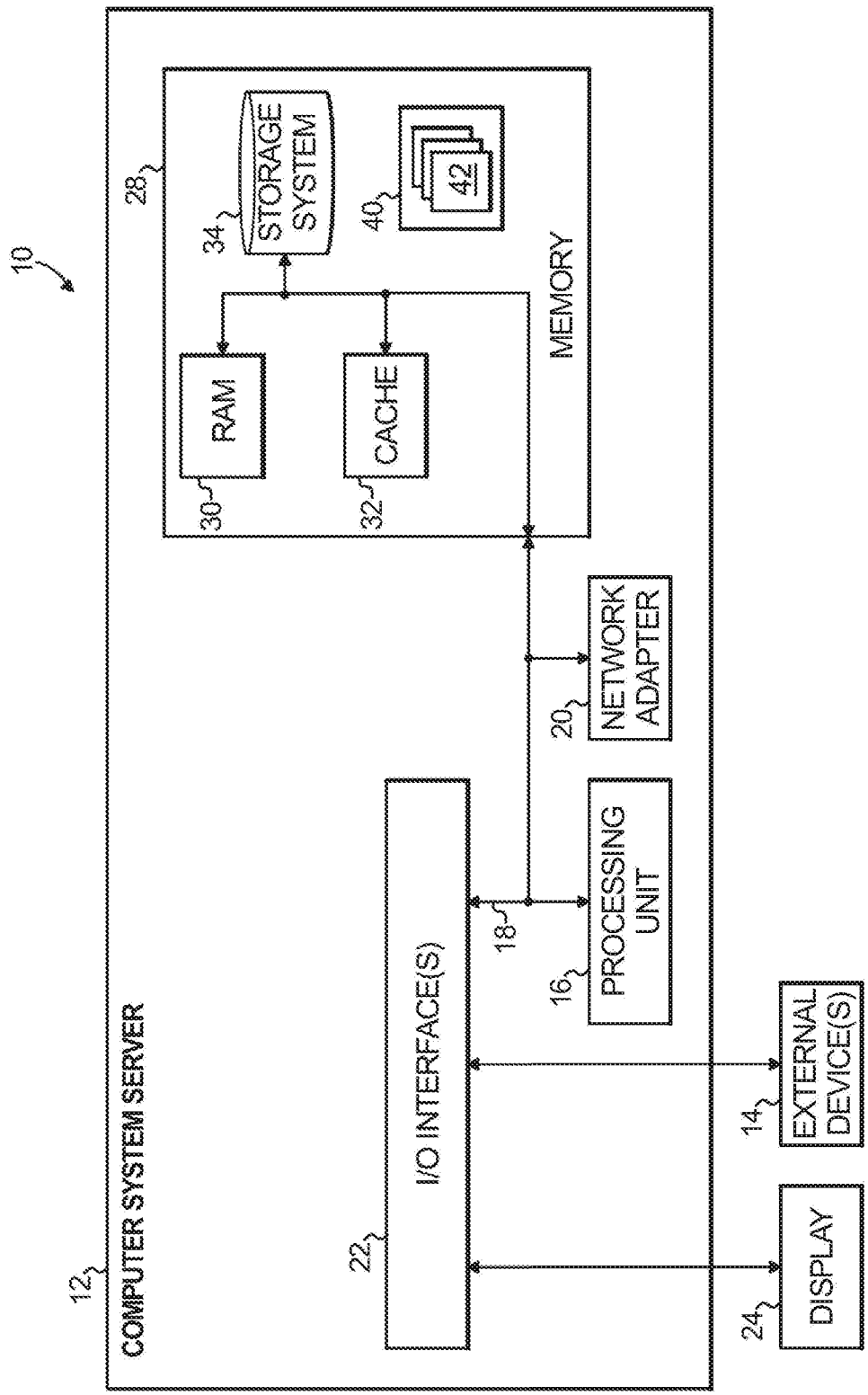
FIG. 1 depicts a cloud computing node according to an embodiment of the present invention.

The subject matter of the instant application will be described with reference to illustrative embodiments. For this reason, numerous modifications can be made to these embodiments and the results will still come within the scope of the invention. No limitations with respect to the specific embodiments described herein are intended or should be inferred.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, and external disk drive arrays, RAID systems, tape drives, and data archival storage systems, etc.

Figure 2:
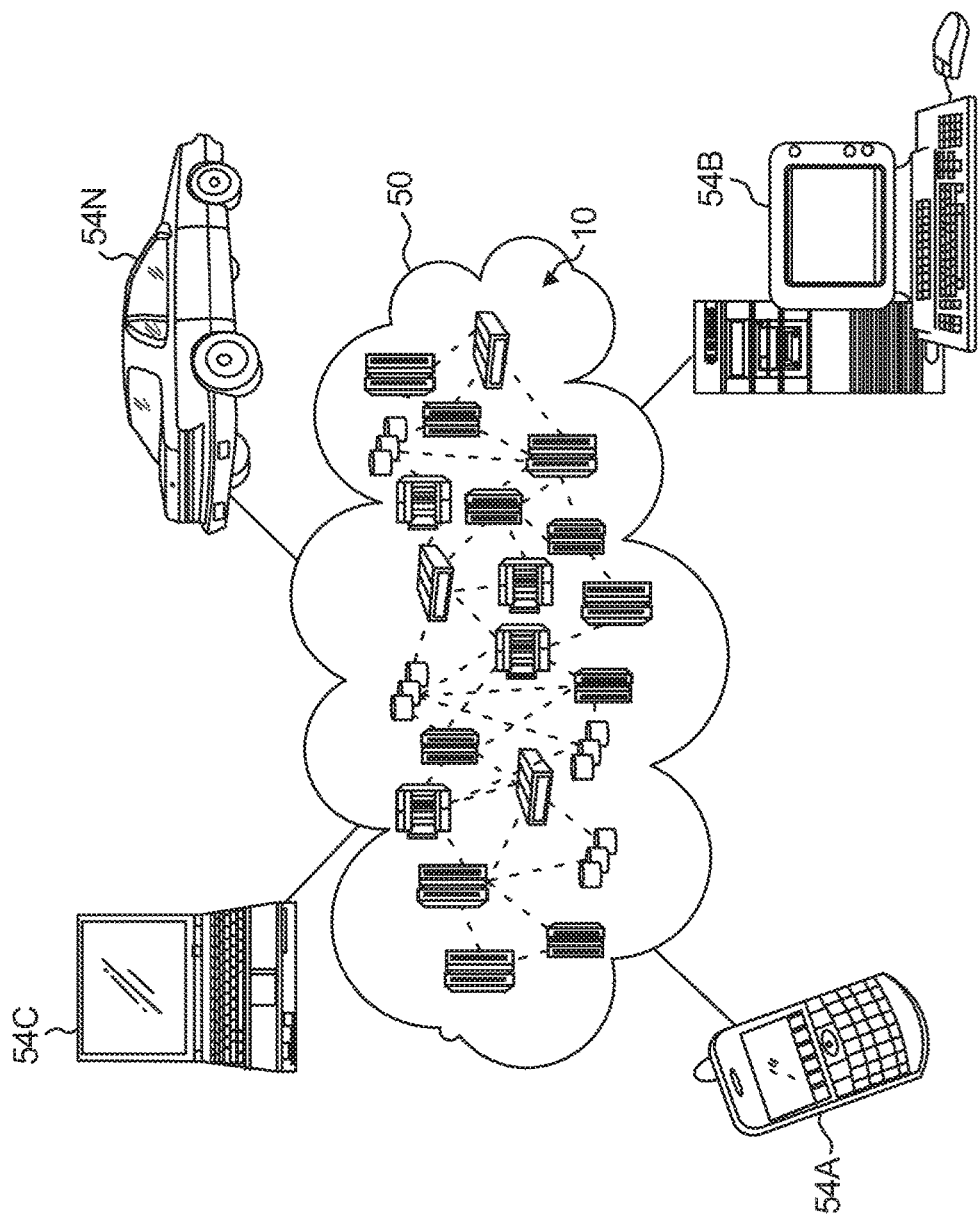
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
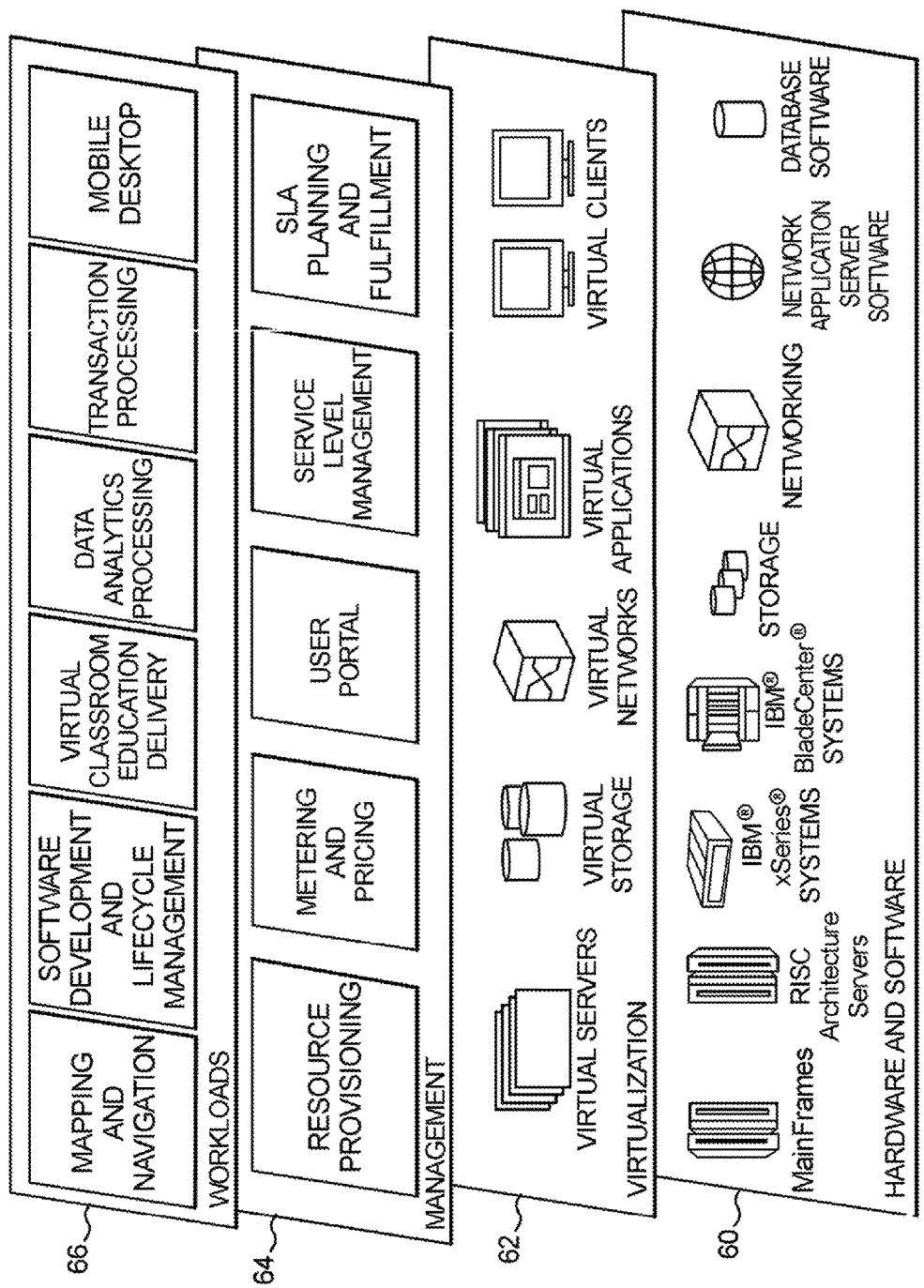
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM Web Sphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and mobile desktop.

Figure 4:
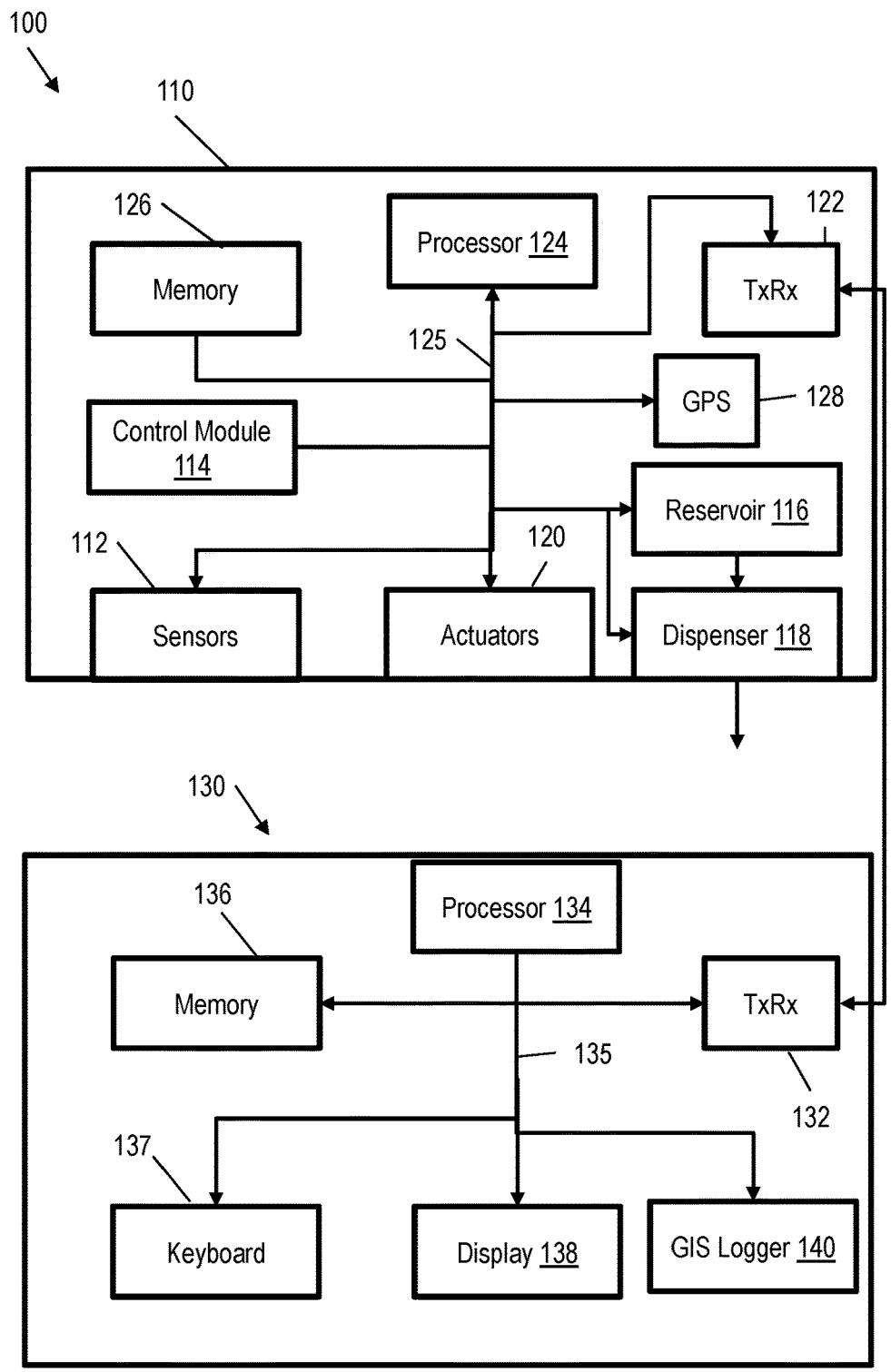
FIG. 4 shows an exemplary drone system.

Referring now to FIG. 4, a system 100 is disclosed herein that includes at least one unmanned aerial vehicle (UAV) or drone 110 that includes one or more sensors 112 for detecting or inferring the presence of a "recipient" (i.e. a person or object with which the drone might interact), and that also includes a control module 114 that identifies situational context, establishes a personality responsive to the context, and then selects an action to take based on the context and the personality. Based on the detection or inference of the recipient, and direction from the control module 114, the UAV 110 takes one or more context-appropriate actions. These actions may include, for example, altering a flight pattern of the UAV 110; modifying a noise profile of the UAV; or releasing a chemical or chemicals from a reservoir 116 through a dispenser 118. Actuators 120 within the UAV control functions of the UAV, such as speed controllers and other mechanisms affecting flight, in order to effect the context-appropriate actions. The drone 110 also may include a processor 124 that facilitates the control module 114 and that is coupled in communication with the sensors 112 and the actuators 120, as well as a transmitter/receiver 122, a memory 126, and a GPS receiver 128 that are coupled in communication with the processor 124.

The sensors 112 incorporated within the UAV 110 include one or more cameras for obtaining high-definition digital images, acoustic detector(s) such as piezoelectric sensors, and/or chemical detector(s). High-definition visual images can facilitate image analysis. Acoustic detection facilitates voice recognition and responses to voice commands or recognition and response to other catalogued auditory stimuli. For example, analog signals detected by an acoustic detector can be amplified and processed to obtain digital signals that are stored in a memory 126 for later analysis.

The detection of the recipient may be based on visual identification using deep neural nets. Visual identification can be assisted by the wireless Tx/Rx (communications module) 122 connecting the UAV to a remote observer or cloud computing system and/or visual images may be stored in a memory 126 within the UAV for later analysis. In such a manner, a high-definition video feed can be provided to a remote professional. The detection of the recipient may also be based on voice or sound recognition, i.e. using an acoustic sensor to detect a verbal command or of footsteps. In certain aspects, the recipient may be detected chemically, i.e. using a digital olfactory sensor that is configured to detect a certain vapor or combination of vapors. In some embodiments, the UAV includes the internal processor 124 that facilitates the control module 114 to determine whether a valid recipient has been detected, and what action should be taken with reference to the recipient. In other embodiments, such processing is conducted at a remote location, i.e., "cloud enabled". Neural nets can, for example, be used to help identify recipients based on visual and/or auditory data. Data obtained by the UAV may be reported to an off-board controller such as the device 130 and/or the cloud server 12.

In cases in which a drone swarm is aiding or working with one or more people, the emotional state and context of the people can be estimated by one or more means: facial expression analysis, gesture detection, body movements and pose, gait analysis, etc. For example, a facial expression might express concern, fear, nervousness, hesitation, etc. The context may change, for example there may be a change in crowd or density of people on the ground in a particular area, etc. Other biometrics may also be employed. For example, a wearable device may be used to estimate pulse, galvanic skin response, and the like. Voice stress analysis may also be employed. For example, a drone near a person or persons may determine (with a certain degree of confidence) a level of concern on the part of a person or persons, and then the drone changes its own behavior and propagates a behavioral response to nearby members of the swarm, suggestive of the need for aid, support, protection, or defense.

Figure 6:
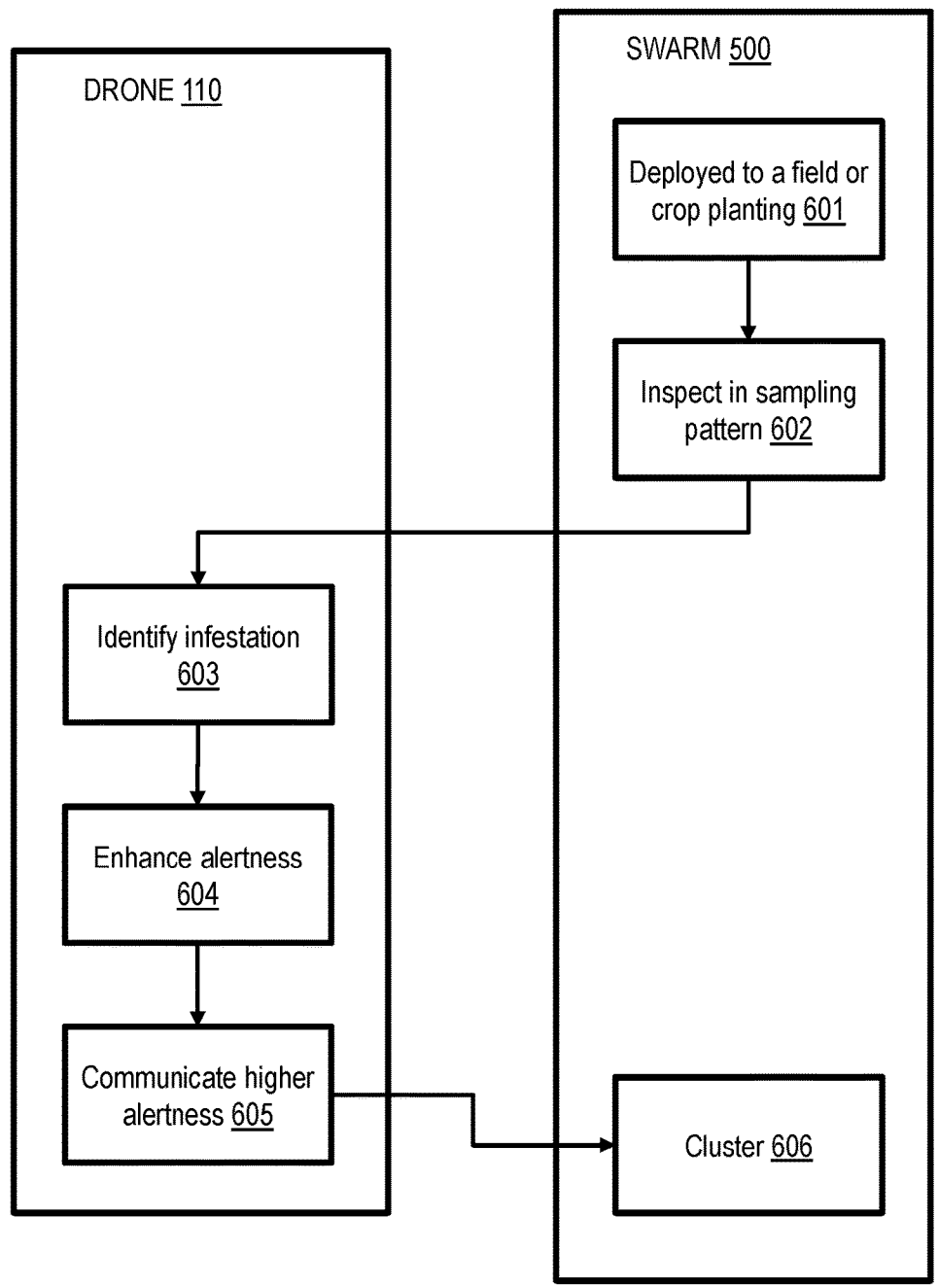
FIG. 6 shows a flowchart of steps accomplished by a drone and a swarm in response to a pest infestation.

The control module 114, which identifies context based on data from the sensors 112 and then implements context-appropriate action via the actuators 120, is further described below with reference to FIG. 6.

In certain embodiments, the drone 110 may include a processor 124 that is configured to facilitate the control module 114, and may be further configured to act as a cloud computing node 10 as shown in FIG. 1. In other embodiments, the control module 114 may be facilitated by a cloud computing node external to the drone 110, and may pass commands to the actuators 120 via a wireless transmitter/receiver Tx/Rx 122.

For example, the UAV 110 can be controlled, at least in part, by a device 130 including a transmitter/receiver 132. The device 130 can be a laptop computer, a smartphone, a tablet, or another suitable device. In addition to the transmitter/receiver 132, the device includes a processor 134, a memory 136, a keyboard 137, and a display 138. Applications for controlling UAVs using such devices are known to the art. The control module 114 may be facilitated wholly or in part by the processor 134 of the device 130 external to the drone 110.

One or both of the device 130 and the UAV 110 may include a GIS logger 140 by which time is correlated with GPS data as well as sensor data. It will be appreciated that the system 100 can be employed in conjunction with cloud-based systems that receive, maintain and process information obtained by the UAV.

Figure 5:
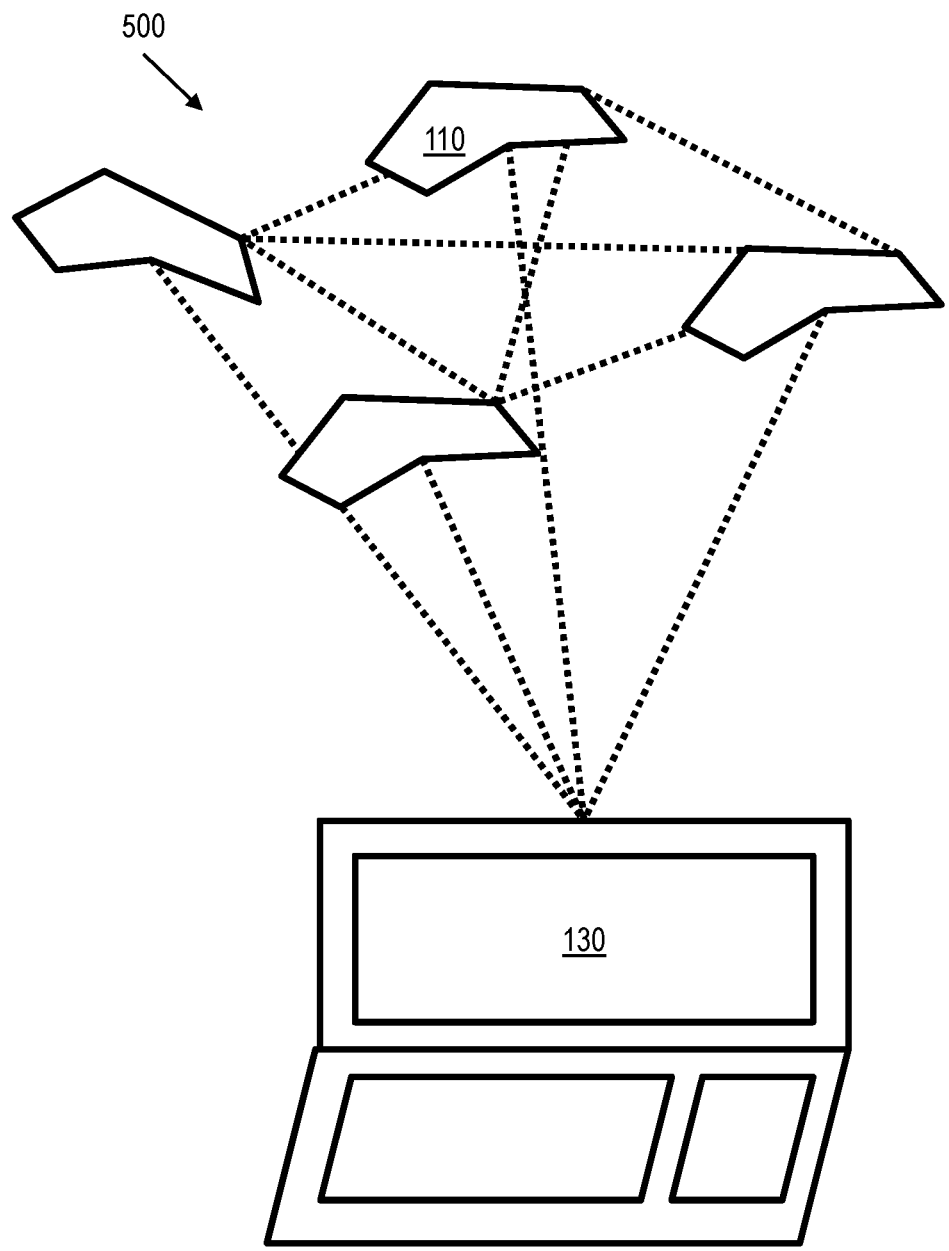
FIG. 5 depicts a swarm of drones.

The system 100 includes a plurality of UAVs 110 to comprise a "swarm" 500, as shown in FIG. 5. At least one of the UAVs in the swarm 500 is configured for detecting or inferring the presence of the recipient.

The UAV may include geolocation features such as tracking hardware and software that enable, for example, GPS tracking so that interactions with recipients may be tracked in a geospatial information system (GIS). Recorded GPS data can be stored in the memory 126 and/or transmitted by the wireless transmitter/receiver Tx/Rx 122 to a central location/cloud server 12. Based on historical interactions at a given location, a menu of appropriate future actions can be adjusted as described further below, thereby enhancing efficiency of action selection. In some embodiments, the UAV can identify an appropriate action based on context.

Operation of the UAV 110 and of the swarm 500 will be better understood with reference to exemplary use cases as further discussed below.

Use Case 1: Crop Scouting (FIG. 6).

Using a behavioral transfer approach, the drone swarm could be used to better anticipate disease outbreaks and apply pesticides or other interventions (or alerting authorities) as required. After being deployed 601 to a field or other crop planting, the drones begin to inspect 602 the field in a random walk or similar sampling pattern. Their small size allows closer inspection of plants to identify infestations and adapt to outbreak modes to contain risk. On identifying 603 an infestation, the detecting drone enhances 604 its level of alertness and communicates 605 the enhanced alertness to nearby drones. (A change in alertness or vigilance may relate to a change in gain of sensors, a change in sensor frequency response, a change in algorithms/software being used by the sensors, a pointing of sensors in a specific direction, a change in flight behavior, a change in sensor resolution, etc.). Thus, a level of alertness or agitation (behavior) begins to propagate through the swarm that places the drones on a differential alert level for problems, throughout the swarm. For example, from being spread out throughout a crop planting (for search efficiency), drones of the swarm could begin to cluster 606 closer to a drone that identifies an infestation and could begin to examine plants more thoroughly (in order to better define the boundaries of the infestation). Through this behavioral adaptation, the swarm could essentially function better as an alternative to human crop scouts for integrated pest management.

Figure 7:
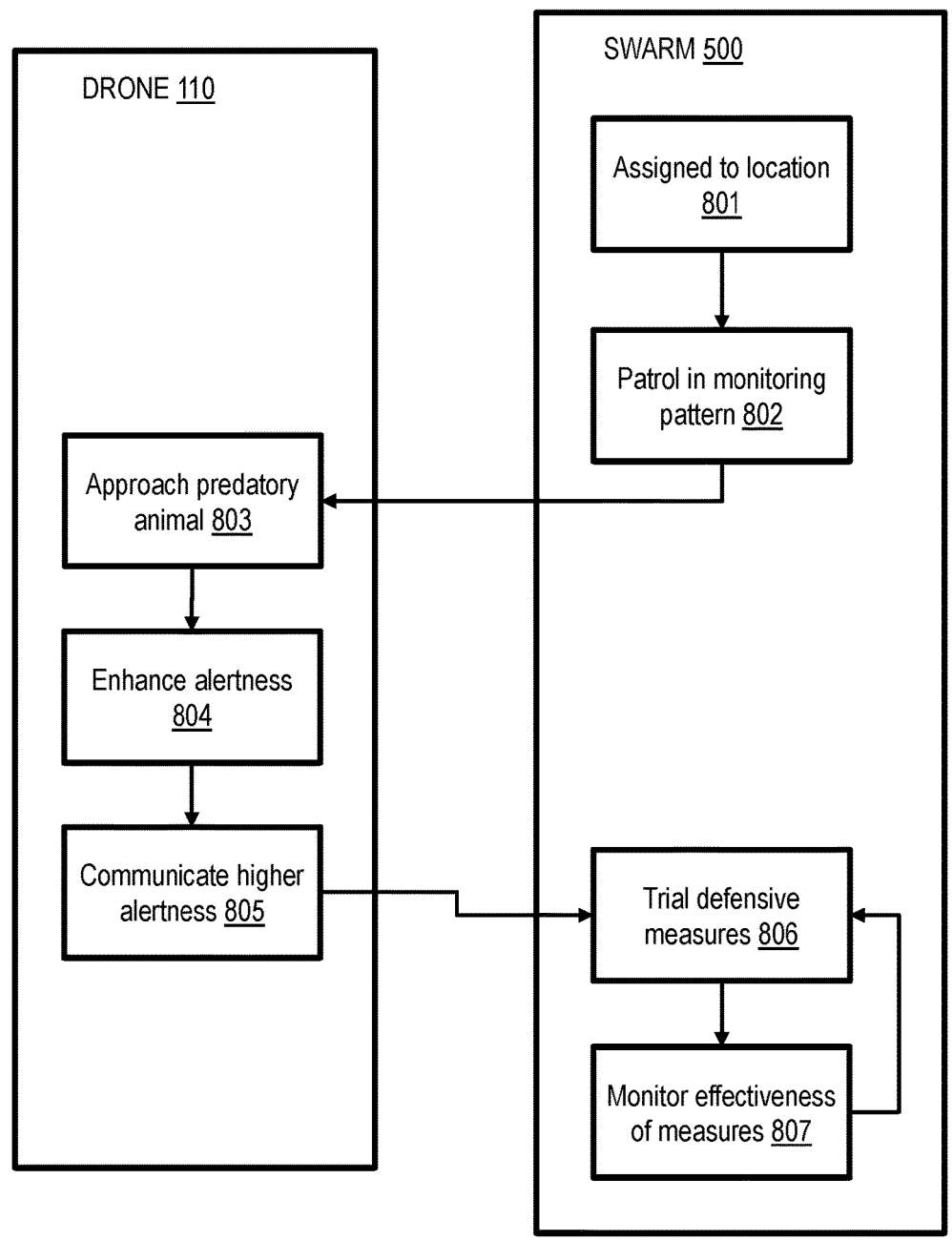
FIG. 7 shows a flowchart of steps accomplished by a drone and a swarm in protecting an area.

Use Case 2: Location Security (FIG. 7).

In other embodiments of the invention, a location is monitored instead of a person or object. For example, a drone swarm is assigned 801 to a location such as a field or pasture. The drone swarm patrols 802 the location in a monitoring pattern. At some time, a drone of the swarm approaches 803 a predatory animal. In response to proximity of the predatory animal (e.g., a wolf), the drone enhances 804 its level of alertness or agitation, and communicates 805 this enhanced level of alertness to nearby members of the swarm, gradually fanning-out spatially through the swarm. The enhanced level of alertness may be expressed as a change in sensor sensitivity or characteristics, changes in drone movements, etc. This behavioral change may be transmitted to nearby drones, so they begin to take on changed and useful behavioral characteristics. For example, the drones of the swarm may undertake defensive measures 806 such as swooping at the wolf.

Thus, when in use for location security, the default personality of the drone swarm might be quiescent. Upon approach by a possible threat, a micro-drone swarm might exhibit signs of alertness. For example, in response to a first drone communicating an "alert" personality, adjoining drones might begin to move in darting motions, the swarm adjusting its configuration to indicate that it is aware of the predatory animal (useful information both for a person monitoring the location, who will thereby be alerted to the threat, as well as for the predatory animal or recipient of the drone swarm's actions, who will thereby be warned away). One drone may become more alert than another because it is in closer proximity to the predatory animal. If the animal continues to approach, the drone swarm might take on a defensive configuration, partly through behavior transfer. If the animal approaches more closely, the swarm might exhibit signs of agitation such as rapid darting movements and buzzing sounds, and finally to active defense.

This progression from quiescence to alertness to defensiveness to agitation to active defense, and the speed and conditions under which it occurs, is one example of what we mean by a personality. Clearly, drone swarm personalities would be tuned to the needs and desires of its owner, and also be tuned to be appropriate in different situations and cultures. The needs and desires can be pre-configured by the owner via one or more user interfaces or can be controlled/updated in adaptive fashion (e.g. learning from interaction patterns or sequences).

Over time, the drone swarm management system may learn useful behaviors, speed of propagation of behaviors to members of the swarm, etc. For example, the drone swarm may trial different defensive measures (e.g., swooping, buzzing, darting toward and away) individually and in combination. The drone swarm may monitor 807 if darting up and down or back and forth are useful in scaring off a wolf near a farm, and may adjust future behaviors (in response to future detection of a predatory animal) accordingly. As another example, if propagating this darting behavior at a certain rate through a swarm (e.g. from drone A near the wolf to drones B and C further from the wolf, and then to drones in the periphery of the swarm) is useful in scaring off the wolf, this pattern of propagation may be learned by the swarm (through storage in the Global History Table) and may become more likely to be used in the future. This same logic may be applied to various forms of scouting behavior for agriculture problems, environmental problems, emergency management, search and rescue, etc.

Figure 8:
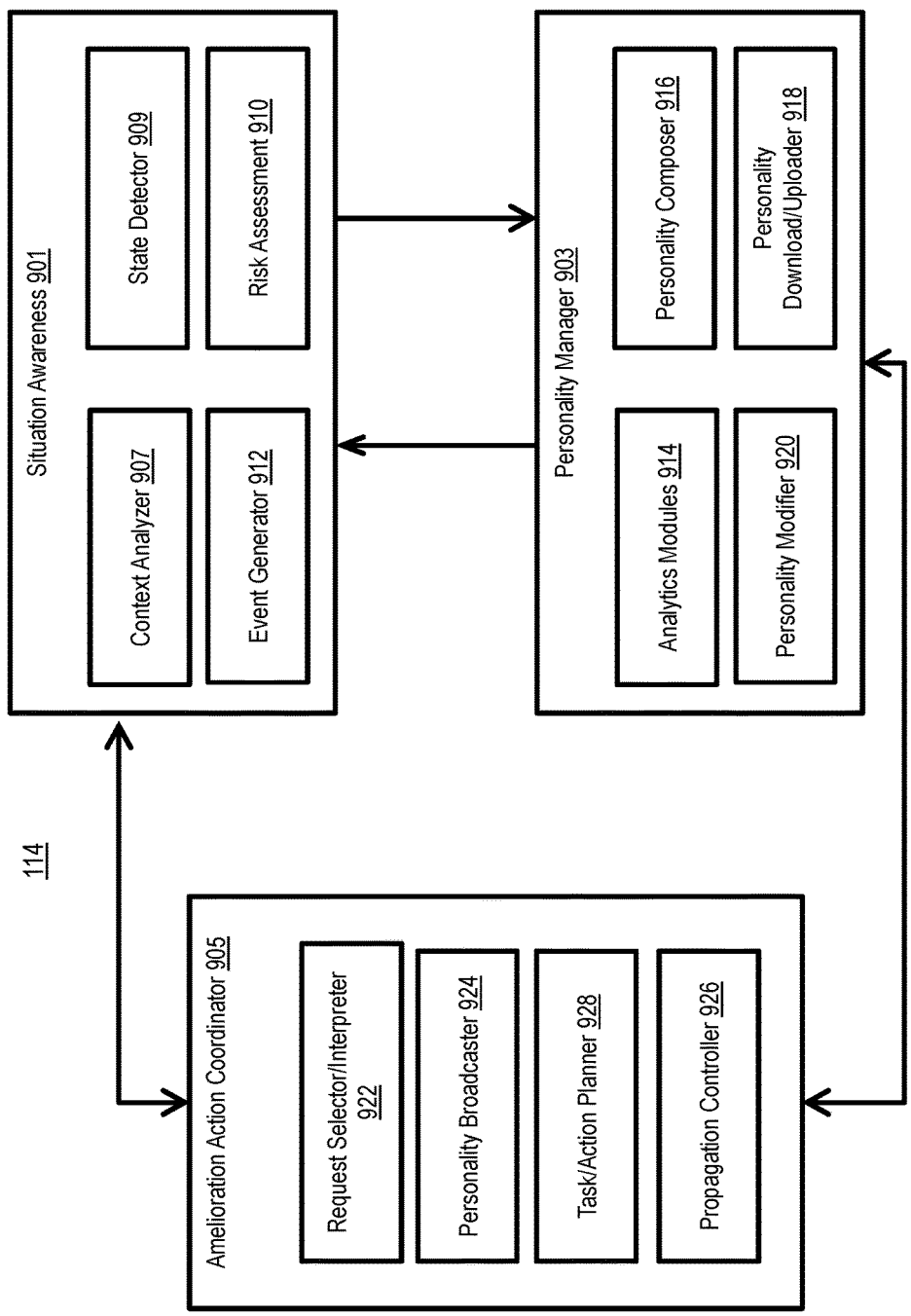
FIG. 8 depicts functional modules of a drone system and their interrelationships.

FIG. 8 depicts sub-modules of the control module 114 that may be implemented in the drone 110 by the processor 124. Alternatively, the control module 114 may be implemented in the cloud computing environment 50, which can be coupled in communication with the drone 110 via the Tx/Rx communications module 122. In exemplary embodiments, the control module 114 includes a situation awareness module 901, a personality manager module 903, and an amelioration action coordinator module 905. The situation awareness module 901 includes a context analyzer 907, a state detector 909, a risk assessment module 910, and an event generator 912. The personality manager module 903 includes a personality composer 916, a personality downloader/uploader 918, a personality modifier 920, and analytics modules 914. The amelioration action coordinator module 905 includes a request selector/interpreter 922, a personality broadcaster 924, a task/action planner 926, and a propagation controller 926.

Referring to the situation awareness module 901, the context analyzer 907 uses data from in-drone sensors 112 or from other devices (e.g., radio frequency connectivity such as Wifi/Bluetooth via the Tx/Rx 122, power, storage) to determine the current and predicted context of the drone (e.g., drone will run low on power, one or more in-drone sensor is damaged, connectivity will be poor for a period of time, low visibility using weather data, wild dog nearby based on image recognition, package delivery destination in sight based on GPS) or nearby drones (e.g., security context). The state detector 909 in real-time monitors the drone's current personality and triggers the personality modifier 920 to adjust the current personality/mode of the drone, adjust sensor sensitivity, etc. accordingly.

The risk assessment module 910 computes and maintains a multidimensional risk vector about the drone and/or an intended recipient of the drone's actions, comprising assessing the current or predicted resource constraint level of the drone (e.g., drone will run low on power or is damaged, connectivity will be poor, low visibility based on weather data) and/or situational context of the recipient (e.g., proximity of a package to be delivered, presence of a hazardous condition, proximity of a potential threat). In case the risk assessment module 910 computes an unacceptably high value for the risk vector (absolute magnitude, or a particular coordinate), then the drone decides whether to transfer personality to one or multiple drones, or simply adjust to a new personality. For example, the drone may transfer its current personality to adjacent drones in case its battery is dying, or in case it has detected a potential threat profile and it can't handle such potential threat profile by itself. In certain embodiments, the risk assessment module 910 also assesses the risk level of sharing a particular personality to a drone or multiple drones which may not be known in the network, as some malicious drones may exploit the personality of other drones for underground economic gain (e.g., leaking sensitive or private information to attacker's controlled drone or remote server).

The event generator 912 uses outputs of the risk analysis, context analysis and detected mode of the drone, generates corresponding events and notifies the personality manager and amelioration action coordinator, which are subscribed to listen to particular events for triggering one or more functionalities. For example, in response to the risk assessment module 910 identifying an unacceptably high risk that the drone's battery will run out, then the event generator 912 will generate a Personality Broadcast event that feeds into the personality manager module 903 and the amelioration action coordinator module 905. As another example, in response to the context analyzer newly detecting a compact moving heat source between about 34.deg.C and about 40.deg.C, the event generator 912 may generate a Lifeform Approaching event. Further, in response to the context analyzer identifying an image of a predatory animal (e.g., a wolf), the event generator 912 may generate a Predator Approaching event.

Referring to the personality manager module 903, the analytics modules 914 learn and generate interaction models (that contain interaction patterns/sequences) based on historical interaction logs that are collected or aggregated from one or more drones over time. For example, the analytics modules 914 may learn a repeated swooping flight pattern as an effective interaction to accomplish the task of driving away a potential threat. Meanwhile, the personality composer 916 retrieves one or more personalities (algorithms that generate actions in response to situational context) from a local personality store (e.g., a database of algorithms that is maintained in memory 126 or 136). The personality composer 916 combines the retrieved one or more personalities to dynamically compose a personality that satisfies interaction patterns/sequences aggregated by the analytics modules of the personality manager. Thus, each drone 110 can modify its personality in response to the actions of other drones in the swarm 500. The personality downloader/uploader 918 takes one or more inputs (e.g., personality type/characteristic from a local or remote personality store or by querying the analytics modules 914, context information from the context analyzer 907, endpoints for one or more personality stores from Global History Table (GHT)) and downloads one or more personalities (with associated metadata) from the cloud computing environment 50 or from the local device 130. Alternatively, in response to Personality Storage event produced by the event generator 912, the personality downloader/uploader 918 may upload a captured personality of the drone into the cloud computing environment 50 or onto the local device 130. Additionally, the personality downloader/uploader module 918 can fetch catalog information from the GHT that stores and shares personalities for authorized drones in the swarm or in a network of swarms.

The personality modifier 920 resets the current personality of the drone with a new personality suitable to the computed context (i.e. environment, interaction history, behavioral history). Thus, the personality modifier 920 is responsive to the context analyzer 907, the state detector 909, and the analytics modules 914.

The amelioration action coordinator module 905 includes a request selector/interpreter 922, a personality broadcaster 924, a propagation controller 926, and a task/action planner 928. The request selector/interpreter 922 receives requests from personality downloading request from one or more drones, selects requests to interpret based on personality matching, context, etc., and interprets the requests based on personality matching, context, etc. In response to the interpreted requests, the request selector/interpreter 922 decides which members should receive the proper behavior and provides said proper behavior (and additional information such a metadata and context) to one or more selected drones. The personality broadcaster 924 receives a continuously updated personality from the personality manager module 903. In response to an event provided from the event generator 912, the personality broadcaster 924 broadcasts the current personality according to parameters set by the propagation controller 926. The propagation controller 926 establishes parameters for broadcasting the current personality, based on context identified by the context analyzer 907. The task/action planner 928 identifies a next action to take, based on the context identified by the context analyzer 907, the state detected by the state detector 909, and the personality composed by the personality composer 916.

Figure 9:
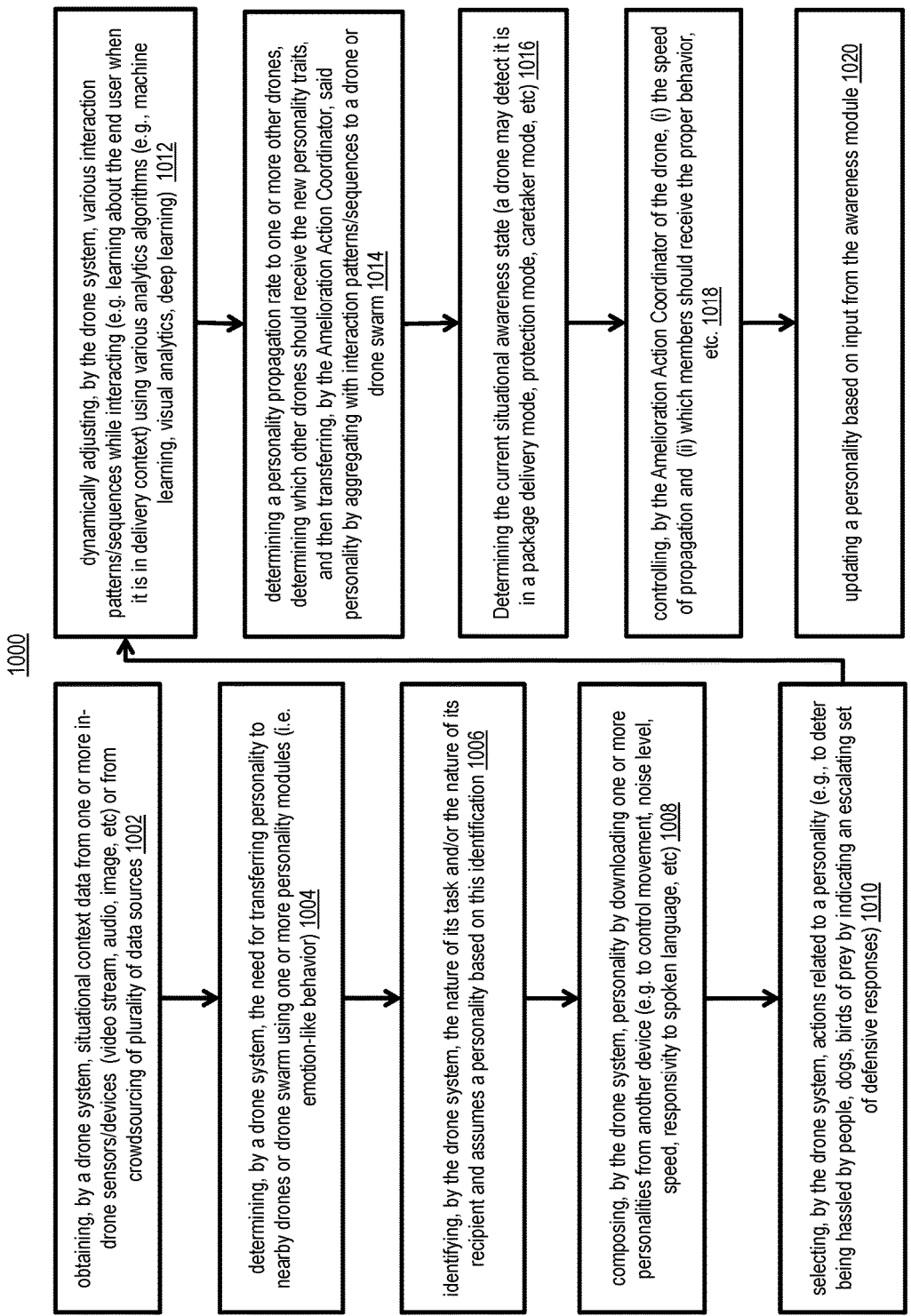
FIG. 9 shows a flowchart of a method facilitated by the functional modules of FIG. 8.

FIG. 9 depicts a flowchart of a method 1000 that is performed by the various sub-modules of the control module 114, according to one embodiment of the invention. Although with reference to FIG. 9 the method steps are shown, described, and numbered in a particular order, many steps can be accomplished in other sequences, out of sequence, and/or in parallel with each other. Additionally, although the steps are described with reference to specific modules or sub-modules as shown in FIG. 8, certain steps may be facilitated by modules other than those specifically described, or may be facilitated by multiple modules cooperating.

According to the exemplary flowchart of FIG. 9, first, the context analyzer 907 obtains 1002 environmental data from one or more in-drone sensors/devices 112 (e.g., video stream, audio, still image, or the like as discussed above) or from crowdsourcing (via the cloud computing environment 50) of a plurality of data sources. Next, the risk assessment module 910 determines 1004 the risk of transferring personality to nearby drones or drone swarm using one or more personality modules (e.g., emotion-like behavior). The personality composer 916 identifies 1006 the nature of its task and/or the nature of its recipient and assumes a personality based on this identification. The personality composer 916 composes 1008 a personality either by combining personalities already stored in the drone, or by downloading one or more personalities from another device, using the personality downloader/uploader 918. Each personality includes algorithms for controlling, e.g., movement, noise level, speed, responsivity to spoken language according to each possible emotion state of the drone 110. The task/action planner 928 identifies 1010 behaviors that are related to the current personality in light of the events produced by the event generator 912 (e.g., actions to deter being hassled by people, dogs, birds of prey by indicating an escalating set of defensive responses; actions to safely deliver a package to a detected doorstep). The personality modifier 920 dynamically adjusts 1012 various interaction patterns/sequences while interacting (e.g. learning about the end user when it is in delivery context) based on the outputs of various analytics algorithms 914 (e.g., machine learning, visual analytics, deep learning). Meanwhile, the propagation controller 926 determines 1014 a personality propagation rate to one or more other drones, determines which other drones should receive the new personality traits, and then activates the personality broadcaster 924 to transfer the drone's current personality to other drones of the swarm by aggregating interaction patterns/sequences from the analytics modules 914. The propagation controller 926 also controls 1016 the speed of propagation as well as which other drones of the swarm should receive the proper behavior, based for example on learned efficacy of various propagation patterns and rates. At the same time, the state detector 910 determines 1018, e.g., using the drone's onboard processor 124 or the cloud computing environment 50, the current situational awareness state (e.g., a drone may detect it is in a package delivery mode, protection mode, caretaker mode). Finally, the personality modifier 920 updates 1020 the drone's personality based on input from the situation awareness module 901.

Figure 10:
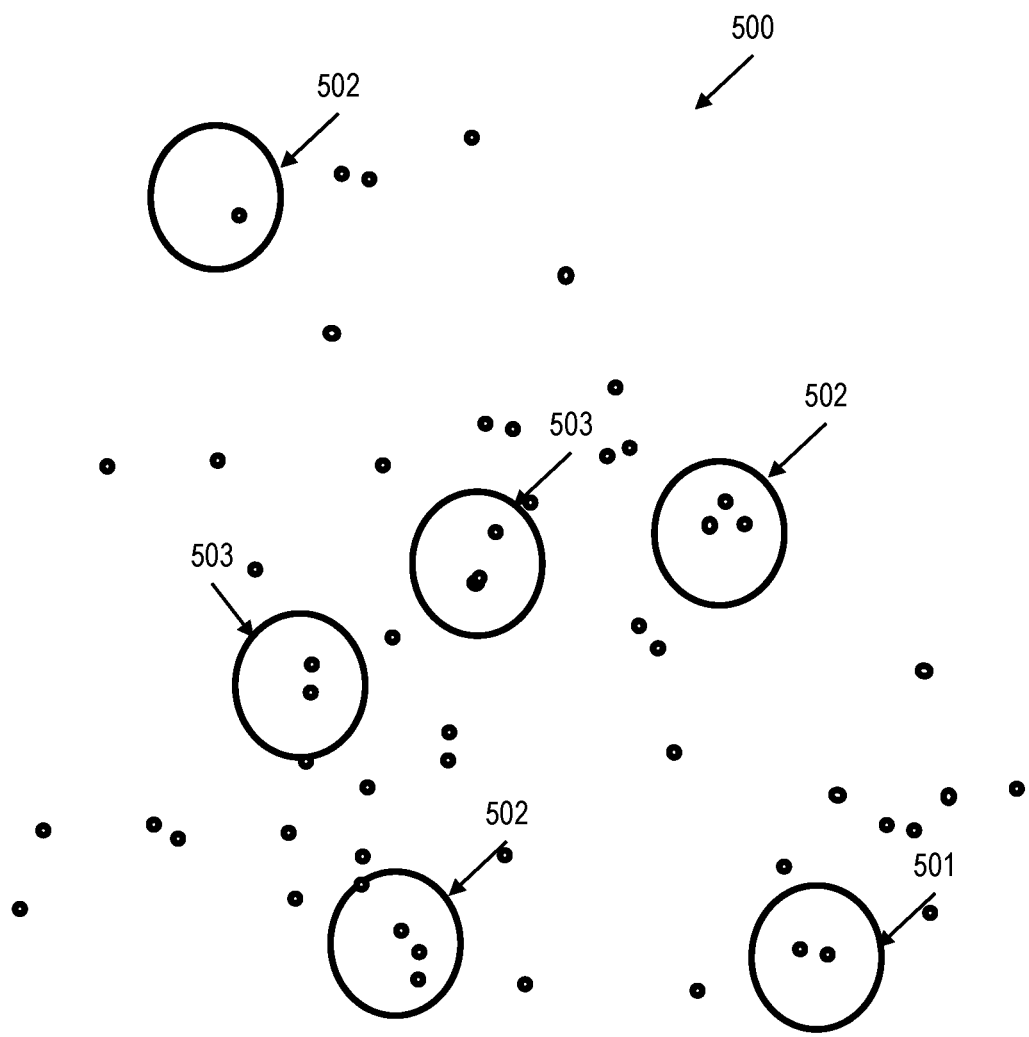
FIG. 10 depicts propagation of personality through a swarm of drones.

As noted above, the personality modifier 920 can dynamically adjust behavior based on learning what is effective to achieve task results. For example, if darting up and down or back and forth are useful in scaring off a wolf near a farm, these behaviors may be made more likely to be used in the future, by modifying the drone's personality to more strongly correlate these behaviors with predator events produced by the event generator 912. Further, the drone's personality also can affect how the propagation controller 926 (1) controls the speed of propagation and (2) determines which members should receive the proper behavior, based on learning from task results. For example, if propagating a darting behavior at a certain rate through a swarm (e.g. from drone A to drones B and C, and then to drones in the periphery of the swarm) proves useful in scaring off a wolf near a farm, the personality modifier 920 can alter the drone's personality so that this mode of propagating the behavior may be more likely to be used in the future. This same logic may be applied to various forms of scouting behavior for agriculture problems, environmental problems, emergency management, search and rescue, etc. Thus, waves of personality changes might spread or ripple among clusters of drones within a drone swarm. The timing and speed of personality propagation can be controlled, e.g. wait 1 second and send to three neighbors. Or wait 2 seconds and send to a drone at the periphery of the swarm. Referring to FIG. 10, within the drone swarm 500 a drone cluster 501 at bottom right may become hyper-vigilant or alert because it detected some possible area of concern (e.g. a danger, a disease on leaves, an intruder, etc.). After 2 seconds, the hyper-vigilance is sent to 3 drone clusters 502 at the edge of the swarm. Then after 3 seconds, the hyper-vigilant behavior is sent to a core region of the swarm 503. Accordingly, in certain embodiments of the invention each drone 110 tracks its relative position within the swarm 500 as well as the positions of its neighbors. Such tracking enables the drones 110 to distinguish to where in the swarm they are propagating personality. The tracking of the positions or navigational patterns are stored onto the GHT. This mode of propagation may have been learned from the past, when it was efficacious in spotting disease in plants, scaring an animal intruder, etc.

Given the discussion thus far, it will be appreciated that, in general terms, an exemplary method, according to an aspect of the invention, includes a first drone 110 identifying situational context 1006 based on signals from at least one sensor; the first drone selecting an action 1010 in response to the situational context, based on a personality of the first drone; and the first drone communicating its personality 1018 to other drones within a swarm of drones, the first drone being a member of the swarm of drones. For example, the first drone may communicate its personality to other drones in response to a magnitude of a risk vector exceeding a threshold value. In certain embodiments, the situational context may include a personality of another drone in the swarm of drones. In some aspects, the situational context includes an identity of a recipient of drone actions. Certain embodiments of the method may include the first drone modifying its personality 1020 in response to situational context, e.g., actions of the other drones. Certain other aspects of the method may include the drone communicating its personality according to a learned pattern of propagation and/or according to a learned rate of propagation.

Certain embodiments of the inventive method also include providing a system that has distinct software modules, each of the distinct software modules being embodied on a computer-readable storage medium. The distinct software modules include, for example, a situation awareness module 901, a personality manager module 903, and an amelioration action coordinator module 905. The step of identifying situational context 1006 is facilitated by the situation awareness module 901 executing on at least one hardware processor. The step of selecting an action 1010 is facilitated by the amelioration action coordinator module executing on the at least one hardware processor. The step of modifying 1020 the personality is carried out by the personality manager module.

In certain aspects, the drone's personality may be configured for crop scouting, or for location security.

In another aspect, a computer program product is provided for controlling a drone in a swarm of drones. The computer program product includes a computer readable storage medium that has program instructions embodied therewith. The program instructions are executable by a drone to cause the drone to identify situational context 1006 based on signals from at least one sensor; select an action 1010 in response to the situational context, based on a personality of the drone; and communicate the personality 1018 of the drone to other drones in the swarm. In certain embodiments, the program instructions may be further executable to cause the drone to modify its personality 1020. For example, the program instructions may be further executable to cause the drone to modify its personality in response to the situational context including a personality of another drone in the swarm. In certain aspects, the situational context may include an identity of a recipient of drone actions. The program instructions may be further executable to cause the drone to communicate its personality at a rate selected based on the situational context.

In another aspect, a drone apparatus includes at least one sensor 112; a memory 126; a communications module 122; and at least one processor 124, which is coupled in communication with the memory, the sensor, and the communications module. The at least one processor is operative to identify situational context 1006 based on signals from the at least one sensor; select an action 1010 to take in response to the situational context, based on a personality facilitated in the processor; and communicate the personality 1018 to another processor via the communications module. In certain embodiments, the at least one processor may be further operative to communicate the drone's personality at a rate selected 1014 based on the situational context. In certain embodiments, the situational context may include a personality of another drone in the swarm of drones. Also, the situational context may include an identity of a recipient of drone actions. According to some aspects, the processor may be further operative to modify the drone's personality. The apparatus may further include a plurality of distinct software modules, each of the distinct software modules being embodied on a computer-readable storage medium, and the distinct software modules including a situation awareness module, a personality manager module, and an amelioration action coordinator module. In such embodiments, the at least one processor is operative to identify the situational context by executing the situation awareness module; the at least one processor is operative to select the action by executing the amelioration action coordinator module; and the at least one processor is operative to modify the drone's personality by executing the personality manager module.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

One or more embodiments of the invention, or elements thereof, can be implemented in the form of an apparatus including a memory and at least one processor that is coupled to the memory and operative to perform exemplary method steps.

One or more embodiments can make use of software running on a general purpose computer. With reference to FIG. 4, such an implementation might employ, for example, the processors 124 and 134, either or both of the memories 126 and 136, and an input/output interface formed, for example, by the keyboard 137 and the display 138. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processors 124, 134, memories 126, 136, and input/output interface such as keyboard 137 and display 138 can be interconnected, for example, via transmitter/receivers 122, 132 to form a UAV data processing system 100. Suitable interconnections, for example via transmitter/receivers 122, 132, can also be provided to a network interface 140, such as a network card, which can be provided to interface with a computer network, and to a media interface 142, such as a diskette or CD-ROM drive, which can be provided to interface with media 144.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 124 that is coupled directly or indirectly in communication with memory elements 126. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 137, displays 138, pointing devices, and the like) can be coupled to the system either directly or through intervening I/O controllers.

Network adapters such as transmitter/receiver 122 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 12 as shown in FIG. 1) running a server program. It will be understood that such a physical server may or may not include a di splay and keyboard.

As noted, aspects of the present invention may take the form of a computer program product embodied in one or more computer readable medium(s) having computer readable program code embodied thereon. Any combination of one or more computer readable medium(s) may be utilized. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

It should be noted that any of the methods described herein can include an additional step of providing a system comprising distinct software modules embodied on a computer readable storage medium; the modules can include, for example, any or all of the elements depicted in the block diagrams and/or described herein; by way of example and not limitation, a situation awareness module, a personality manager module, and an amelioration action coordinator module. The method steps can then be carried out using the distinct software modules and/or sub-modules of the system, as described above, executing on one or more hardware processors 124 or 134. Further, a computer program product can include a computer-readable storage medium with code adapted to be implemented to carry out one or more method steps described herein, including the provision of the system with the distinct software modules.

In any case, it should be understood that the components illustrated herein may be implemented in various forms of hardware, software, or combinations thereof; for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

Exemplary System and Article of Manufacture Details

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A computer-implemented method comprising:
   identifying, by a first drone, a situational context based on signals from at least one sensor;
   selecting, by the first drone, an action based on an algorithm of the first drone that defines behaviors in response to the situational context, including movement, noise level, speed and responsivity to spoken language; and
   communicating, by the first drone, the algorithm of the first drone to at least a second drone within a swarm of drones, the first drone being a member of the swarm of drones.

2. The method of claim 1 wherein the first drone communicates the algorithm to the at least second drone in response to a magnitude of a risk vector exceeding a threshold value.

3. The method of claim 1 further comprising receiving an algorithm of another drone in the swarm of drones, by the first drone, wherein the situational context includes the algorithm of the another drone in the swarm of drones.

4. The method of claim 1 wherein the situational context includes an identity of a recipient of drone actions.

5. The method of claim 1 further comprising:
   receiving an algorithm of another drone in the swarm of drones, by the first drone, wherein the situational context includes the algorithm of the another drone in the swarm of drones; and
   modifying, by the first drone, the algorithm of the first drone in response to the situational context.

6. The method of claim 5, further comprising providing a system, wherein the system comprises distinct software modules, each of the distinct software modules being embodied on a computer-readable storage medium, and wherein the distinct software modules comprise a situation awareness module, a personality manager module, and an amelioration action coordinator module;
   wherein:
     identifying situational context is facilitated by the situation awareness module executing on at least one hardware processor;
     selecting an action is facilitated by the amelioration action coordinator module executing on the at least one hardware processor; and
     modifying the algorithm of the first drone is facilitated by the personality manager module.

7. The method of claim 1 further comprising communicating, by the first drone, the algorithm of the first drone according to a learned pattern of propagation.

8. The method of claim 1 further comprising communicating, by the first drone, the algorithm of the first drone according to a learned rate of propagation.

9. The method of claim 1 wherein the algorithm of the first drone is configured for at least one of crop scouting or location security.

10. A computer program product for controlling a drone in a swarm of drones, the computer program product comprising a computer readable storage medium that embodies program instructions executable by a drone to cause the drone to:
    identify situational context based on signals from at least one sensor;
    select an action, based on an algorithm of the drone that defines behaviors in response to the situational context, including movement, noise level, speed, and responsivity to spoken language; and
    communicate the algorithm of the drone to at least a second drone in the swarm.

11. The product of claim 10 wherein the program instructions are further executable to cause the drone to modify its algorithm.

12. The product of claim 11 wherein the program instructions are further executable to cause the drone to modify its algorithm in response to the situational context including an algorithm of another drone in the swarm.

13. The product of claim 10 wherein the situational context includes an identity of a recipient of drone actions.

14. The product of claim 10 wherein the program instructions are further executable to cause the drone to communicate its algorithm at a rate selected based on the situational context.

15. A drone apparatus comprising:
    at least one sensor;
    a memory;
    a communications module; and
    at least one processor, coupled in communication with the memory, the sensor, and the communications module, and operative to:
      identify situational context based on signals from the at least one sensor;

select an action to take, based on an algorithm, facilitated in the processor, that defines behaviors in response to the situational context including movement, noise level, speed, and responsivity to spoken language; and communicate the algorithm to another processor via the communications module.

16. The apparatus of claim 15 wherein the at least one processor is further operative to communicate the algorithm at a rate selected based on the situational context.

17. The apparatus of claim 15 wherein the situational context includes an algorithm of another drone in the swarm of drones.

18. The apparatus of claim 15 wherein the situational context includes an identity of a recipient of drone actions.

19. The apparatus of claim 15 wherein the processor is further operative to modify the algorithm in response to the situational context.

20. The apparatus of claim 19, further comprising a plurality of distinct software modules, each of the distinct software modules being embodied on a computer-readable storage medium, and wherein the distinct software modules comprise a situation awareness module, a personality manager module, and an amelioration action coordinator module;

wherein:

said at least one processor is operative to identify the situational context by executing said situation awareness module;

said at least one processor is operative to select the action by executing said amelioration action coordinator module; and said at least one processor is operative to modify the algorithm by executing said personality manager module.

* * * * *